(No Model.)
F. H. RICHARDS.
REVERSING DRIVING DEVICE.
No. 558,661. Patented Apr. 21, 1896.
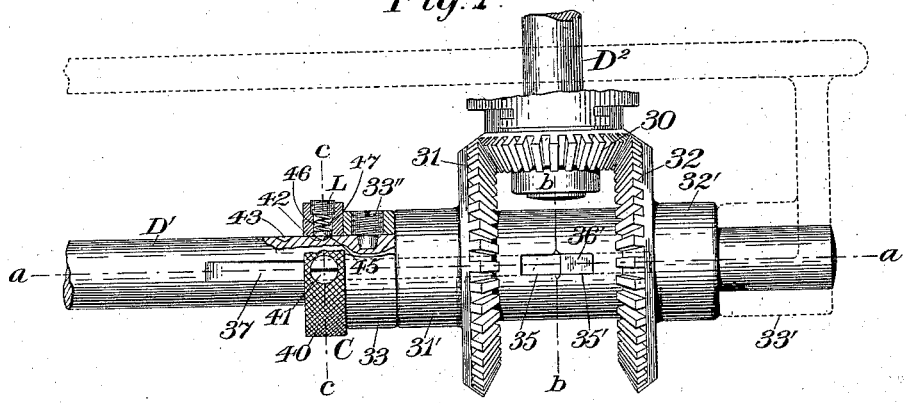
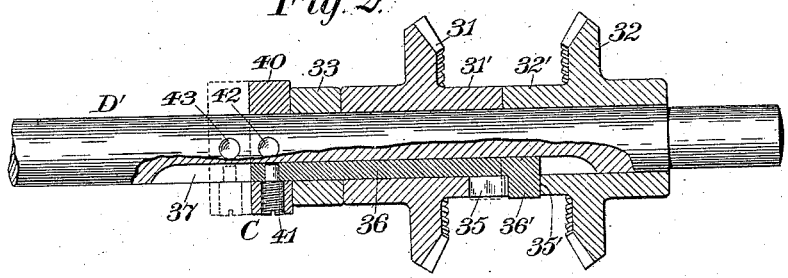
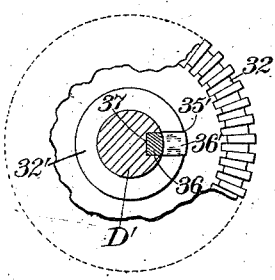
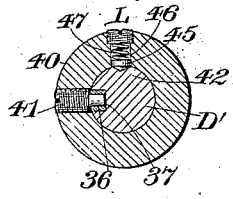
Witnesses:
J. L. Edwards Jr.
Fred. J. Dole.
Inventor:
F. H. Richards.

UNITED STATES PATENT OFFICE.

FRANCIS H. RICHARDS, OF HARTFORD, CONNECTICUT.

REVERSING DRIVING DEVICE.

SPECIFICATION forming part of Letters Patent No. 558,661, dated April 21, 1896.

Application filed March 18, 1895. Serial No. 542,139. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Reversing Driving Devices, of which the following is a specification.

This invention relates to reversing driving devices.

The object of the invention is primarily to furnish a reversing driving device of improved and simplified construction and organization, adapted for use with machines wherein it is desired to simultaneously rotate two working parts in the same or in opposite directions and wherein it is desired to reverse the direction of rotation of one part at a predetermined point in the rotation thereof without effecting a change in the direction of rotation of the other part and without alteration in the operative relations of said parts.

My improved reversing driving device is especially adapted for use as an actuating instrumentality between a reciprocatory needle-bar and a reversibly-revoluble loop-taker in combined lock-stitch and chain-stitch sewing-machines, and is also adapted, when used in this connection, for simultaneously actuating the needle-bar and loop-taker and for reversing the direction of rotation of the loop-taker, as is required to form a different kind of stitch, without effecting any change in the movement of the needle-bar relatively to the movement of the loop-taker or without changing the operative relation between the needle-bar and loop-taker, and is also adapted to act as a locking device to hold the loop-taker against a reversal in the direction of movement thereof until the requisite hook of said loop-taker is in proper operative relation with the needle.

In the drawings accompanying and forming part of this specification, Figure 1 is a side elevation, partly in section, of my improved reversing driving device, a portion only of a driving and a driven shaft being shown. Fig. 2 is a vertical longitudinal section of my reversing driving device, taken in dotted line *a a*, Fig. 1. Fig. 3 is a vertical cross-section of my reversing driving device, taken in dotted line *b b*, Fig. 1, and looking toward the right hand in said figure; and Fig. 4 is a cross-sectional view of my reversing driving device, taken in dotted line *c c*, Fig. 1, looking toward the left hand in said figure.

Like characters represent like parts in all the figures of the drawings.

My improved reversing driving device in the preferred form thereof herein shown comprises two rectangularly-disposed shafts $D'$ and $D^2$, the one $D'$ of which will for convenience be hereinafter referred to as the "driven shaft," and the one $D^2$ of which will be termed the "driving-shaft;" a driving-gear 30, carried at the lower end of the driving-shaft $D^2$; two oppositely-operable and alternately effective and ineffective driven gears 31 and 32 in mesh with the driven gear 30 at opposite sides thereof, which gears are carried upon the driven shaft $D'$ and are adapted for alternately rotating said shaft in opposite directions, respectively; a clutch (designated in a general way by C) adapted for effecting and maintaining a fixed operative relation between the driven shaft $D'$ and one or the other of the driven gears 31 and 32, and a locking device (designated in a general way by L) in position and adapted for automatically engaging and locking the clutch in its adjusted or shifted positions, as will be hereinafter more fully described.

In the form of reversing driving device herein shown and described the two driven gears 31 and 32, together with the driven gear 30, with which said driven gears 31 and 32 mesh, are in the nature of bevel-gears. The two gears 31 and 32, which are preferably of duplicate construction and interchangeable, are revolubly mounted directly upon the driven shaft $D'$, with the inner adjacent faces of the hubs 31' and 32', respectively, thereof in bearing contact, as shown most clearly in Figs. 1 and 2 of the drawings. The gears 31 and 32 are held against movement longitudinally of the shaft $D'$ preferably by means of suitable abutments upon the shaft $D'$, one of which abutments, as 33, is in the nature of a collar adjustably fixed to the shaft $D'$ by a set-screw 33'' and abuts against the outer end of the hub 31' of the gear 31, as shown in said Figs. 1 and 2, and the other of which abutments, for the outer end of the hub 32', may, as shown in dotted lines at 33', Fig. 1, be a bearing in which one end of the driven shaft is journaled.

The inner adjacent ends of the hub 31' and 32' of the gears 31 and 32 are shown notched or cut away at one side thereof to form clutch-pin sockets 35 and 35', respectively, which clutch-pin sockets are adapted for registering one with the other at certain points in the rotation of the gears 31 and 32, and are adapted for receiving alternately a clutch-pin 36' on the shiftable member 36 of the clutch device C, which is carried by and rotated with the driven shaft D', the construction and operation of which clutch device will be hereinafter more fully described.

The clutch C, which in the form thereof shown is in the nature of a shiftable pin-clutch, and which is carried by the driven shaft D', and which is adapted for operatively engaging the two driven gears alternately, comprises the angularly-elongated shifting member or key 36, seated for shifting movement longitudinally of the driven shaft D' in a shallow keyway or channel 37, formed in the periphery of said shaft, and carrying a laterally-projecting clutch-pin 36' at one end thereof in position and adapted for engaging in the sockets 35 and 35' alternately in the hubs of the gears 31 and 32, respectively, said pin projecting beyond the periphery of the shaft D' and normally engaging in one or the other of said sockets 35 and 35', as will be readily understood by reference to Figs. 1, 2, and 3 of the drawings.

As a convenient means for facilitating the shifting of the clutch C to engage the same with one driven gear before releasing the other driven gear and to effect a change in the direction of rotation of the driven shaft D', I have provided, in connection with said clutch, an actuator or "pull," which, in the preferred form thereof herein shown, is in the nature of a peripherally-knurled collar 40, mounted for shifting movement upon the shaft D', and preferably removably fixed to the shiftable clutch member 36 by means of a screw 41, and as a means for automatically locking the clutch in its adjusted or shifted position I have provided, in connection therewith, a locking device L, (herein shown in the nature of a spring-actuated detent,) carried by the actuator 40 in position and adapted for alternately engaging in lock-notches 42 and 43, formed in the periphery of the driven shaft D. These lock-notches 42 and 43 will preferably be in horizontal alinement with one another, and will set a distance apart corresponding to the extreme distance traversed by the clutch member 36 in engaging the same with one or the other of the driven wheels 31 and 32, as will be readily understood by reference to Figs. 1 and 2 of the drawings. This locking device, in the form thereof herein shown, consists of a conically-pointed lock-pin 45, seated in a socket 46, formed through the collar 40, a spiral spring 47 in bearing engagement at its inner end with said lock-pin, and an adjusting-screw screwed into the outer end of said socket and bearing against the outer end of said spiral spring, as shown in Figs. 1 and 4 of the drawings.

It is desired to state in this connection that the specific construction of the locking device may be changed without departure from invention, and that the organization and arrangement of said locking device relative to the clutch member 36 may also be modified within the scope and limits of my invention. Therefore I do not desire to limit myself to the particular construction and organization of said locking device shown in the drawings.

In Figs. 1 and 2 of the drawings the reversing device is shown operative for rotating the driven shaft forward, as required for forming a lock-stitch, when the device is used in connection with sewing-machines, as before described, the clutch C being shown in engagement with the driven wheel 32, the driven wheel 31 in this instance running free upon the driven shaft D'.

When it is desired to rotate the driven shaft D' in a direction opposite to that above described, the two driven gears are rotated until the clutch-pin receiving-sockets 35 and 35' of the two gears 31 and 32, respectively, register with each other. This brings the two gears into proper relation to permit the clutch-pin to be shifted from the socket of gear 32 to the socket of the other gear 31, and also brings all of the parts into the requisite relation to facilitate the change in the direction of rotation of the shaft without changing the former coöperative relations of the driving and driven shaft. When the two gears have arrived in the coöperative relation just described, the rotation of said gears is temporarily stopped and the clutch C is shifted longitudinally of the driven shaft D', through the medium of the actuator, to the position shown in dotted lines in Fig. 2, which carries the clutch-pin 36' into engagement with the driven wheel 31, as will be readily understood by reference to said Fig. 2, when said driven gears may both be again rotated by means of the driving-shaft in the same direction as they were before rotated, which will effect a change in the direction of rotation of the driven shaft without alteration in the former operative relations of the driving-shaft and driven shaft.

From the construction and organization of the constituents of the reversing driving device herein described it will be evident that the clutch is practically locked as against operative movement at all times except when the clutch-sockets of the driven gears are brought into registration and the driving and driven shafts have a predetermined operative position relatively to each other, thus preventing a change being made in the direction of rotation of the driven shaft until the driving and driven shafts are in a predetermined coöperative position. This is of material importance and facilitates the use of improved reversing mechanism in machines of certain branches in the art, in which the ordinary clutch mechanism would be wholly impracticable.

It is believed that a reversing driving device having a driven shaft, two gears revolubly mounted on said shaft, and a clutch carried by and movable longitudinally of the driven shaft and adapted for locking and releasing said gears alternately relatively to the driven shaft, and for locking one gear to the other gear and both gears to the driven shaft before releasing said other gear from locked engagement with said shaft, and vice versa, and comprehending means for holding the clutch against effective movement until said two gears are in a predetermined coöperative position, and also embodying means for rotating said gears in opposite directions, respectively, is novel in the art to which this invention appertains. Therefore I do not desire to limit myself to any specific construction of the several elements comprehended in said reversing driving device, except in so far as is necessary to the functions recited.

Inauguration of the shifting movement of the clutch-pin will release the lock-pin 45 of the locking device from engagement with the walls of one of the locked notches of the driven shaft, and upon the completion of the shifting movement of said clutch the locked pin will automatically engage in the other of said locked notches, as will be understood by reference to Fig. 3 of the drawings.

By the construction and organization of my reversing driving device herein shown and described it will be seen that in the operation thereof to reverse the direction of rotation of the driven shaft the clutch positively locks the driven shaft against rotation during its shifting movement from one driven gear to the other gear, and that it locks one driven gear to the shaft and to the other driven gear before releasing said other driven gear from locked engagement with said shaft. Furthermore, it will be seen that the shifting of the clutch to reverse the direction of rotation of the driven shaft can only take place at a predetermined point in the rotation of the driven gears, as it is necessary that the clutch-pin socket in the hubs of the two driven gears shall register with each other before the shifting of the clutch-pin can take place.

Having thus described my invention, I claim—

1. A reversing driving device comprehending a driven shaft; two driven gears revolubly mounted on said shaft; a clutch carried by, and movable longitudinally of, the driven shaft, and adapted for locking and releasing said gears alternately relatively to the driven shaft, and for temporarily locking the two gears together and to the driven shaft before releasing either gear from said shaft; means for rotating said gears in opposite directions; and means comprehended in said organization for holding the clutch against effective movement until said two gears are in a predetermined coöperative position.

2. The combination in a reversing driving device, of a driven shaft; two driven gears revolubly mounted on said shaft; a sliding clutch carried by, and rotating with, said shaft, and adapted for locking and releasing said driven gears, alternately, relatively to said shaft, and locking one gear to the other gear and to the shaft, before releasing said other gear from locked engagement with said shaft; a locking-detent carried by the clutch, and adapted for engaging the shaft to lock the clutch in its shifted position, and in engagement with one or the other of the driven gears; a driving-gear in mesh with, and rotating, said driven gears in opposite directions; and means for rotating said driving-gear, substantially as described.

3. The herein-described reversing driving device, it consisting of a driven shaft having a longitudinal pin-clutch-receiving groove in the periphery thereof; two oppositely-disposed driven gears revolubly mounted upon said shaft, and having clutch-pin sockets in the adjacent ends of the hubs thereof; a pin-clutch shiftably carried in the groove in said driven shaft, and having a clutch-pin in position and adapted for engaging in one or the other socket in one or the other driven-gear hubs, and for locking one driven gear to the other driven gear and to the driven shaft, before unlocking said other driven gear from said shaft; a driving-gear in mesh with said driven gear, and adapted for simultaneously rotating said driven gears in opposite directions; a driving-shaft for actuating said driving-gear; and a locking-detent in connection with, and adapted for automatically locking, the clutch in its shifted positions, and against longitudinal movement relatively to the driven shaft, substantially as described, and for the purpose set forth.

4. A reversing driving device comprising a driven shaft having a longitudinal pin-clutch-receiving groove; two driven gears revolubly mounted upon said shaft, and having clutch-pin sockets in the adjacent faces thereof; and a pin-clutch shiftably carried in the groove of said driven shaft, and having a clutch-pin in position and adapted for engaging in the clutch-pin socket of one or the other driven gear, and for locking one driven gear to the other driven gear and to the driven shaft before releasing said other driven gear from locked engagement with said shaft.

5. A reversing driving device comprising a driven shaft; two oppositely-disposed driven gears revolubly mounted upon said shafts, and having clutch-pin sockets in the adjacent ends of the hubs thereof; a rigid clutch member shiftably carried by and rotative with the driven shaft, and having a clutch-pin in position and adapted for engaging in the socket of one or the other driven-gear hub, and for locking one driven gear to the other driven gear and to the driven shaft before releasing the other driven gear from locked engagement with said shaft; a driving-gear in mesh with said driven gears, and adapted for simultaneously rotating said driven gears in opposite directions; and a driving-shaft for rotating said driving-gears.

6. A reversing driving device comprehending a driven shaft; two driven members revolubly mounted on said shaft; a clutch for engaging and temporarily locking the two members against relative movement and to the shaft before releasing either of said members from locked engagement with said shaft; and means for rotating said members in relatively-reverse directions.

FRANCIS H. RICHARDS.

Witnesses:
FRED. J. DOLE,
BENTON N. PARKER.